(No Model.)

J. JOHNSTON.
WEATHER STRIP.

No. 387,078.  Patented July 31, 1888.

ATTEST.
J. Henry Kaiser.
Victor J. Evans.

INVENTOR.
Joseph Johnston.
By L. Deane
Atty.

UNITED STATES PATENT OFFICE.

JOSEPH JOHNSTON, OF AUSTIN, ILLINOIS.

WEATHER-STRIP.

SPECIFICATION forming part of Letters Patent No. 387,078, dated July 31, 1888.

Application filed October 31, 1887. Serial No. 253,899. (No model.)

*To all whom it may concern:*

Be it known that I, JOSEPH JOHNSTON, a citizen of the United States, residing at Austin, in the county of Cook and State of Illinois, have invented certain new and useful Improvements in Weather-Strips; and I do hereby declare the following to be a full, clear, and exact description of the invention, such as will enable others skilled in the art to which it appertains to make and use the same.

Figure 1:
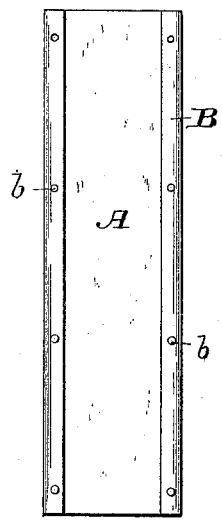
Figure 2:
Figure 3:
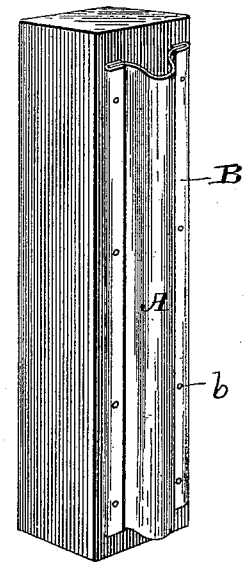
Figure 4:
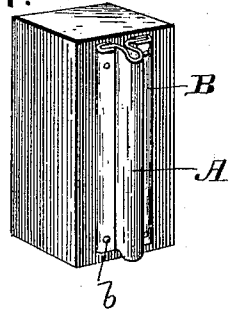
Figure 5:
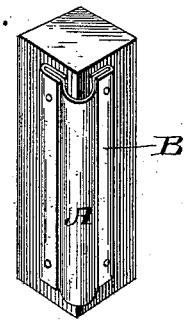
Figure 6:
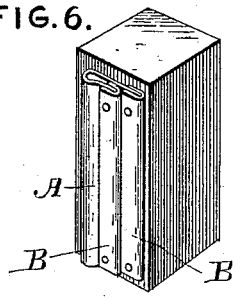
Figure 7:
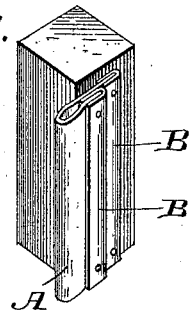

Figure 1 is a plan view of this invention. Fig. 2 is a sectional view of Fig. 1. Figs. 3, 4, 5, 6, and 7 are perspective views showing in various forms device as applied to the edge of a door or window.

Heretofore weather strips have been made by using a thin piece of rubber and confining its edges in grooves in the door or molding, so that the rubber would be bent along the line of its length so as to bow outwardly, and thus effectually close the crack between the edges of the door and the jamb. This general idea has been carried out in many ways, but in every instance that I know of there has been considerable difficulty in securing the edges of the rubber to the door-edge.

The process of grooving the door-edge was expensive, the detail of inserting the edges of the rubber in such grooves was quite tedious, and in use these edges would come out after but little wear. Therefore the aim and intent of this invention are to provide a device that can be easily and cheaply made and easily and cheaply applied to the door or other place where it may be used, so that it will be a permanent and durable fixture.

To this end my invention consists in a thin and narrow ribbon-like piece of rubber or other elastic having its longitudinal edges bound with metal whereby it can be affixed to the door, so that the rubber or elastic may bulge out at any suitable distance to close the space between the door when closed against the jamb.

In the accompanying drawings, A denotes the flexible material, which may be rubber or any similar substance. Indeed, some forms of woolen or vegetable fiber may be prepared to answer like purposes very well, since it can be so made as to possess the needed requisites of imperviousness and flexibility. This material A is cut into long narrow ribbon-like pieces and each of its longitudinal edges is covered and protected by thin metal strips B, which, being pressed firmly down on the said material, will have a firm and secure hold upon it, so that it cannot ordinarily be separated therefrom except by applying an instrument to raise its edges. While this means of securing the metal edges upon the elastic material is preferred, the edges of the metal may be indented into the material, or there may be used any other suitable and convenient means for accomplishing the same result.

In applying this device in use it is only necessary to drive tacks or small nails $b$ through the metal, and thus first secure one edge of the strip in place. Then, after the necessary height of the bulge or projection of the elastic material, so that it shall properly fill the space between the door-edge and the jamb, sill, or top of the door has been ascertained, the other metallic strip is secured in like manner in place. It will be noted that the height of this bulge of the elastic material can be regulated at will by the position of the metallic edges—that is, by placing the metal edges as close together as possible the greatest bulge of the elastic material will be produced, and this bulge can be lessened at will, according as these strips are moved. When thus applied in position, both of the edges are fully protected against strain and wear by means of the metallic binding upon both of them.

It is usually desirable that the tacks used in fastening the device in position shall pass through the edges of the elastic material as well as through the metal strips.

It may be ordinarily desirable to have the metal edges perforated for the easy insertion of the tacks $b$.

In preparing this strip it is proposed to make it in very long pieces and then cut off from each piece such lengths as may be desired for use in each particular case.

The strips can be applied to the jamb or sill or upper part of the door-frame, or to the edges, bottom, or top of the door, the principle aim in the invention being to provide an article of trade and sale that can be easily and quickly applied for its desired uses.

In practice this device has been found very effectual for the uses for which it is designed and a durable affair. It will not only prevent the inflow of air, but it is a sure preventive of the entrance of dust.

Having now described my invention, I claim as new—

A weather-strip consisting of a central narrow piece, A, of elastic material, and metal binding-strips B B, firmly secured to and protecting the longitudinal edges of the elastic strip, whereby, by means of nails or screws passed through the metallic strips into a door or door-frame, the portion of the elastic unprotected by the metal strips may be made to bulge outward to a varying degree, substantially as shown and described.

In testimony whereof I affix my signature in presence of two witnesses.

JOSEPH JOHNSTON.

Witnesses:
  STEPHEN LAWSON,
  H. N. WIGG.